US012312125B1

(12) United States Patent
Hiland

(10) Patent No.: US 12,312,125 B1
(45) Date of Patent: May 27, 2025

(54) NESTAINER CLOSURE SYSTEM

(71) Applicant: Kraig Hiland, Maysville, GA (US)

(72) Inventor: Kraig Hiland, Maysville, GA (US)

(73) Assignee: David Shipley, Scottsdale, AZ (US)

( * ) Notice: Subject to any disclaimer, the term of this patent is extended or adjusted under 35 U.S.C. 154(b) by 0 days.

(21) Appl. No.: 18/917,944

(22) Filed: Oct. 16, 2024

Related U.S. Application Data

(60) Provisional application No. 63/656,870, filed on Jun. 6, 2024.

(51) Int. Cl.
*B65D 19/02* (2006.01)
*B65D 19/38* (2006.01)
*H01F 7/02* (2006.01)

(52) U.S. Cl.
CPC ............. *B65D 19/02* (2013.01); *B65D 19/38* (2013.01); *B65D 2519/0082* (2013.01); *H01F 7/0252* (2013.01)

(58) Field of Classification Search
CPC ........ B65D 19/02; B65D 19/38; B65D 19/44; B65D 2519/0082; H01F 7/0252; H01F 7/0257
USPC ................................................ 108/55.1, 55.5
See application file for complete search history.

(56) References Cited

U.S. PATENT DOCUMENTS 1,027,907 A * 5/1912 Sammon ................ B65D 19/38 294/67.41
1,832,271 A 11/1931 Williams
2,392,755 A 1/1946 Michaels
2,696,360 A * 12/1954 Toffolon ................ B65D 19/44 410/97
2,886,105 A * 5/1959 Lee .......................... B60J 5/125 160/335
2,886,367 A * 5/1959 Montanino ............ B65D 19/38 294/67.4
3,178,216 A * 4/1965 Huber .................... B65D 85/68 206/509
3,371,815 A * 3/1968 Macomber ............... B65D 9/20 217/51
3,408,771 A 11/1968 Garrett et al.
3,480,174 A * 11/1969 Sherwood ............ B65D 88/022 294/67.4

(Continued)

FOREIGN PATENT DOCUMENTS

WO 2022208186 A1 10/2022

*Primary Examiner* — Jose V Chen
(74) *Attorney, Agent, or Firm* — Invention To Patent Services; Alex Hobson

(57) ABSTRACT

A nestainer closure assembly includes a cable closure assembly, a magnetic latch retainer and cable attachments. A cable closure assembly includes a cable fixed to a support of a nestainer and a latch end having a latch thereon for detachable attachment to a cable attachment that is attached to a support located on an opposing side of the loading opening. The cable extends across the loading opening from the fixed end to the latch end latched in a closed configuration. When in an open configuration, the latch end and latch of the cable closure assembly is detachably attached to a magnetic latch retainer configured on the same side of the loading opening as the fixed end. A magnetic latch retainer includes a magnet and a latch retainer extension that extends out from the magnet, such as from the center of a ring magnet, for receiving the latch thereon.

20 Claims, 9 Drawing Sheets

(56) References Cited

U.S. PATENT DOCUMENTS

| | | | | | |
|---|---|---|---|---|---|
| 3,832,956 | A * | 9/1974 | Briel, Jr. | E04B 1/3445 | 108/55.1 |
| 5,092,541 | A * | 3/1992 | Tofflemire | B64D 9/00 | 206/386 |
| 5,245,787 | A | 9/1993 | Swenson et al. | | |
| 6,044,998 | A * | 4/2000 | Schearer | B65D 19/18 | 206/600 |
| 8,308,393 | B2 | 11/2012 | Jette | | |
| 8,419,095 | B2 * | 4/2013 | McAfee | B65D 19/38 | 294/67.4 |
| 8,890,689 | B2 | 11/2014 | Ezzo et al. | | |
| 10,184,279 | B2 | 1/2019 | Day et al. | | |
| 10,640,260 | B1 * | 5/2020 | McAtarian | B65D 85/84 | |
| 10,836,572 | B2 * | 11/2020 | Derderian | B65F 1/1426 | |
| 11,679,878 | B1 * | 6/2023 | Grenga | B65D 19/38 | 244/137.1 |
| 11,680,442 | B2 * | 6/2023 | Zwierzykowski | E06B 9/0653 | 160/32 |
| 2008/0237168 | A1 * | 10/2008 | Harpole | B65D 19/12 | 211/195 |
| 2008/0238595 | A1 * | 10/2008 | Chiang | H01F 7/0257 | 335/284 |
| 2013/0181464 | A1 * | 7/2013 | Ness | B65D 90/24 | 294/68.1 |
| 2013/0213830 | A1 * | 8/2013 | Schurrie | B65D 81/00 | 206/216 |
| 2014/0109992 | A1 * | 4/2014 | Ness | B65D 19/385 | 137/376 |
| 2019/0161269 | A1 * | 5/2019 | Hamner | B21C 47/24 | |
| 2022/0048685 | A1 * | 2/2022 | Justitz | B65D 19/385 | |
| 2022/0219861 | A1 * | 7/2022 | Nelson | B65D 71/0096 | |
| 2022/0303659 | A1 * | 9/2022 | Lu | H04R 1/1016 | |
| 2023/0220861 | A1 | 7/2023 | Dickinson et al. | | |
| 2024/0017881 | A1 * | 1/2024 | Martin | B65D 19/38 | |

* cited by examiner

NESTAINER CLOSURE SYSTEM

CROSS REFERENCE TO RELATED APPLICATIONS

This application claims the benefit of priority to U.S. provisional patent application No. 63/656,870, filed on Jun. 6, 2024; the entirety of which is hereby incorporated by reference herein.

BACKGROUND OF THE INVENTION

Field of the Invention

The invention relates to a nestainer closure system and method of closing a nestainer loading opening using said nestainer closure system.

Background

Nestainers are used in warehouses to more items, product, product components from one location to another. The nestainers may not have wheels but have a fork-truck opening along the base for lifting and movement by a fork-truck. Nestainers have a loading opening, an open side for loading and removal of items therein. For safety, the nestainer loading opening must be closed during transport of the nestainer, to ensure that items do not fall out of the nestainer. Elastic bands or bungee cords have been used but these can cause serious injury if not secured or when they come loose. The stored energy in the elastic band causes them to snap back and the hook can impale a person puncturing their skin or worse yet hitting and injuring their eye. Rotating or pivoting gates have also been used but these also can cause injury as the rotating rigid bar can create a pinch point along a support of the nestainer. Also, the rigid bar can swing down and hit a person, also causing injury. There exists as need for a quick and convenient way to close a loading opening of a nestainer that does not pose a safety issue.

SUMMARY OF THE INVENTION

The invention is directed to a nestainer closure system that utilizes a nestainer closure assembly including a cable closure assembly, a magnetic latch retainer and cable attachments. A cable closure assembly includes a cable that is flexible with a fixed end, fixed to a support of a nestainer and a latch end having a latch thereon for detachable attachment to a cable attachment that is attached to a support located on an opposing side of the loading opening from the fixed end of the cable. The cable extends across the loading opening from the fixed end to the latch end latched to the cable attachment when in a closed configuration. When in an open configuration, the latch end and latch of the cable closure assembly is detachably attached to a magnetic latch retainer configured on the same side of the loading opening as the fixed end, such as on the same support of the nestainer. A magnetic latch retainer includes a magnet and a latch retainer extension that extends out from the magnet, such as from the center of a ring magnet, for receiving the latch thereon. The magnet secures the latch in place with the latch retainer extension extending through a latch aperture of the latch. This system enables quick closure and opening of a loading opening of a nestainer without posing any risk of injury. The magnet and latch retainer extension ensure that the latch will not come loose when in an open configuration and the latch configured around a cable attachment loop ensures the latch will not come loose when in a closed configuration.

A nestainer is an enclosure for retaining items, such as products within a warehouse. A nestainer does not have wheels but has a fork-truck opening to enable a fork-truck to lift and move the nestainer. A nestainer may be large enough to retain a number of items and may have a height of about 1.5 m or more, about 1.75 m or more, about 2 m or more, about 2 m or less or any range between and including the values provided. The width of the nestainer and/or the loading opening width, for loading and unloading items into and from the nestainer, may be about 0.75 m or more, about 1 m or more, about 1.25 m or more, about 1.5 m or more, about 2 m or less and any range between and including the values provided.

A latch includes an arm that pivots about a latch pivot to open the latch for insertion of a cable attachment loop within the latch aperture. A latch arm may be spring engaged about the pivot such that the latch automatically closes when not being opened manually. A latch may comprise a latch spring coupled with the latch arm for this purpose. An exemplary latch is a carabiner and may be coupled to the cable by a loop of the cable and a compression sleeve or any other suitable means of connecting the latch to the latch end of the cable.

A cable may include a strength member such as a wire or braided wire enable the cable to sustain a high load without breaking. An exemplary cable includes a wire or braided wire covered by a cable cover, such as a plastic sleeve over the wire. Also, a cable may be a braided rope or other type of cable that has a break load of at least 50 lbs or more, 100 lbs or more, or even 200 lb or 500 lbs or more. A cable of the cable closure assembly may have a length that is about the same or slightly greater than the loading opening and may be about 0.75 m or more, about 1 m or more, about 1.25 m or more, about 1.5 m or more, about 2 m or less and any range between and including the values provided.

A cable attachment includes a loop for attachment of the latch thereon and may be an eyebolt that is secured to a nestainer support of a pad-eye, having a cable attachment loop that extends from a mounting plate. The mounting plate may have one or more fastener apertures for securing the pad-eye to a nestainer support via fasteners, such as screws or bolts.

A magnetic latch retainer is configured to retain the latch thereon when the nestainer is in an open configuration. A magnetic latch retainer includes a magnet and a latch retainer extension. The magnet may be a ring magnet, a magnet having a central aperture therethrough and the latch retainer extension may extend centrally out from the ring magnet and may be secured to the nestainer or a magnetic latch retainer housing through the central aperture in the magnet. A latch retain extension may include magnet fastener and a bushing, wherein the magnet fastener extends through the bushing, through the aperture in the magnet and into a support of the nestainer.

An exemplary magnet may have a magnetic strength to retain the latch thereto and the latch retainer extension prevents the latch from sliding due to gravity or inertia forces when moving the nestainer and becoming dislodged. A magnet may have a magnetic strength of about 100 gauss or more, about 500 gauss or more, about 1,000 gauss or more, about 2,000 gauss or more and any range between and including the magnetic strength values provided. A magnet may be sized and have a magnetic strength to ensure the latch is retained on the magnetic latch retainer. A magnet may have a width or diameter of about 25 mm or more, about 35 mm or more, about 50 mm or more, about 75 mm or more, from about 35 mm to about 75 mm and any other range between and including the values provided. Again, a magnet may be a ring magnet that is planar, having a circular outside perimeter and a magnet aperture centrally configured through the magnet from a first surface to an opposing second surface.

An object attached to a magnet by a magnetic force, such as a magnetic material, can be slid across the face of a magnet rather easily but it takes a much greater force to pull a magnetically attracted object orthogonal from a magnet surface. Therefore, the combination of the magnet and latch retainer extension combine to ensure the latch is secured in place. Also, the latch retainer extension enables very quick location of the latch on the magnetic latch retainer. Simply positioning the latch proximal to the latch retainer extension enables the magnet to pull the latch over the latch retainer extension and onto or proximal to the magnet. The latch may be a magnetic material or include a magnetic material component. A magnetic material, as used herein, is a magnet or a material, such as a metal that is attracted to a magnet.

The magnetic latch retainer has a latch retainer extension that extend out from the magnet to receive the latch thereon. The latch retainer extension may be a cylindrical protrusion from the magnetic latch retainer and the nestainer support. The latch retainer extension extends a support offset distance from the nestainer support which may be about 50 mm or less, about 35 mm or less, about 25 mm or less. This support offset distance should be large enough to enable the latch to extend thereover but not excessive large to avoid problems with moving the nestainer or packing nestainers next to each other. A magnet offset distance is the distance the latch retainer extension extends from the magnet or magnet housing and will be smaller in dimension than the support offset distance and may be about latch retainer extension extends. Again, this magnet offset distance should be larger than a width of a latch to ensure the entire latch can extend thereover. Finally, a latch offset distance extends from the latch to the extended end of the latch retainer extension, when the latch is configured thereon. This latch offset distance may be small to prevent snagging of the latch when removing the latch from the latch retainer extension and may be about 25 mm or less, about 15 mm or less, about 10 mm or less and any range between and including the values provided.

An exemplary nestainer closure system may include one, two, three or even four cable closure assemblies configured on a nestainer. A plurality of cables may extend across the loading opening to ensure items do not fall out of the interior of the nestainer.

A first side support of a nestainer may be on the left or right side of the loading opening and the second side support is the opposing side from the first side support. The magnetic latch retainer is configured on the same side of the loading opening and may be on the same support of the nestainer as the fixed end of the cable, which may be secured to a cable attachment. A cable attachment is configured on the opposing side of the nestainer loading opening from the fixed end of the cable and from the magnetic latch retainer.

A method of closing and opening a loading opening of a nestainer includes; providing a nestainer closure assembly that includes a cable closure assembly as described herein.

The term magnetically attached, as used herein to describe the latch attachment to the magnetic latch retainer, means that the latch is retained proximal to the magnet and requires a force of at least 0.5 lbs to remove the latch from the magnetic latch retainer.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
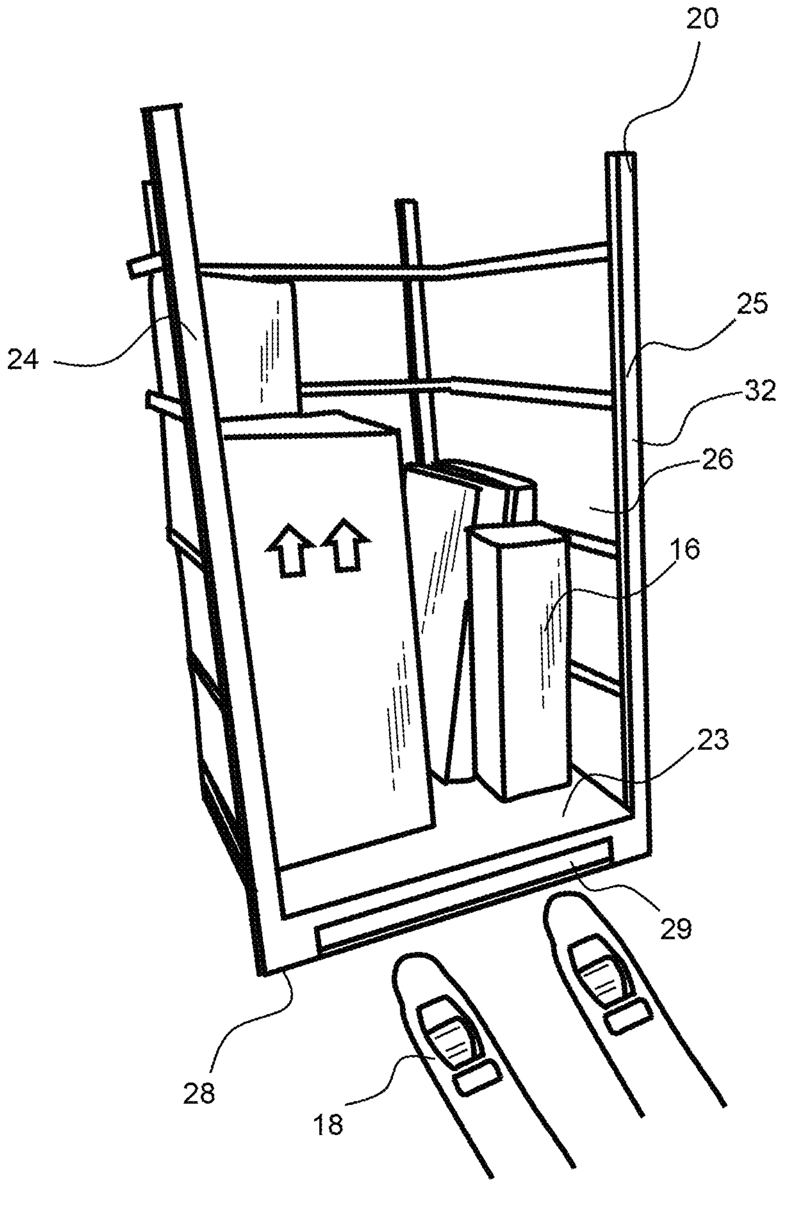
FIG. 1 shows a nestainer having items within the interior of the nestainer and loading opening between a first side support on a left side of the loading opening and second side support on a right side of the loading opening and a fork-truck opening configured along the base on the load side of the nestainer.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Referring now to FIG. 1, a nestainer 20 has items 16 within the interior of the nestainer and a loading opening 26 between a first side support 24, on a left side of the loading opening and second side support 25, on a right side of the loading opening, and a fork-truck opening 29 configured along the base 28 on the load side 32 of the nestainer. A fork-truck 18 is configured to extend the forks of the fork truck into the fork-truck opening to move the nestainer. The loading opening 26 is required to be closed to prevent the items, such as products, from falling out of the nestainer during transport.

Figure 2:
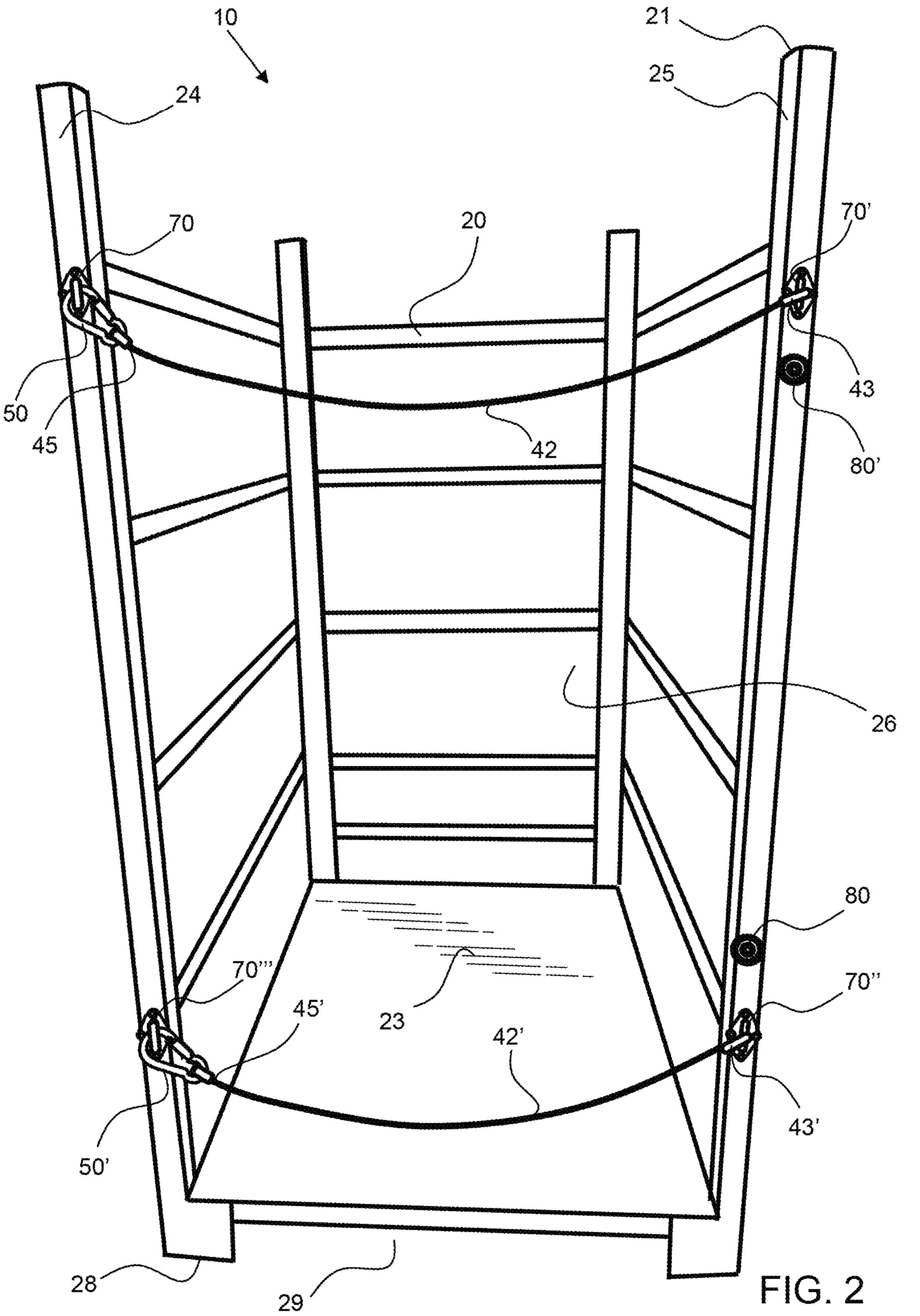
FIG. 2 shows an exemplary nestainer closure system in a closed configuration with two cables extending across the loading opening of the nestainer and extending between cable attachments.
Figure 3:
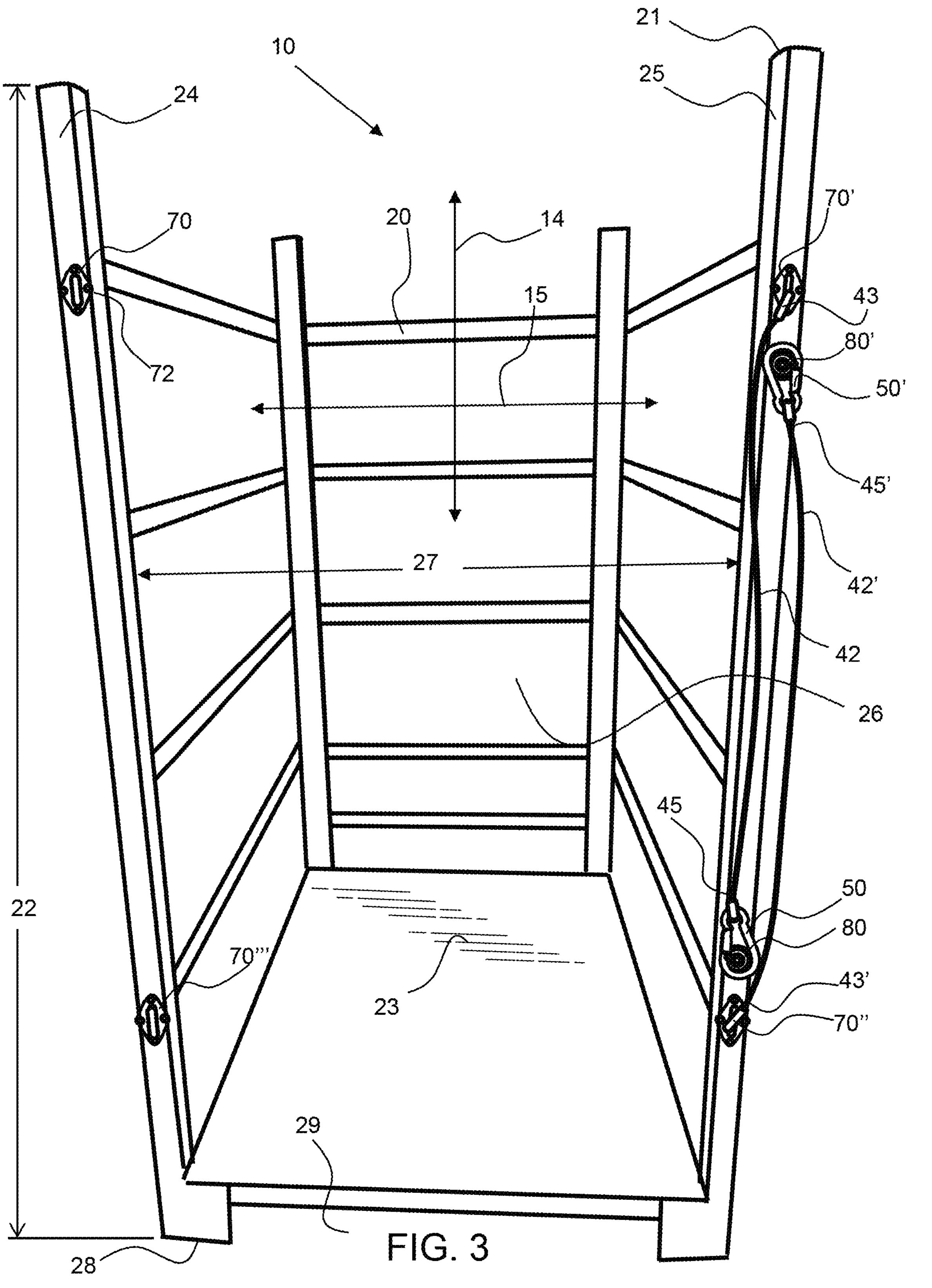
FIG. 3 shows the exemplary nestainer shown in FIG. 2 in an open configuration with each of the two cables now extending along a side support with the latch coupled with a magnetic latch retainer.

Referring now to FIGS. 2 and 3, an exemplary nestainer closure system 10 includes a cable 42 that extends across the loading opening 26 from a fixed end 43 to a latch end 45, having a latch 50 configured to detachably attach to a cable attachment 70 having a cable attachment loop 72. The latch 50 can be detached and then retained on a magnetic latch retainer 80 to enable loading and unloading items into and from the nestainer. As shown in FIG. 3, the nestainer has the first and second side supports and other supports that extend vertically up or generally along the vertical axis 14 from the floor 23 that extends along a horizontal axis 15.

As shown in FIG. 2, the nestainer 20 is in a closed configuration with two cables 42, 42' extending across the loading opening 26 of the nestainer 20 and extending between cable attachments, 70, 70', 70", 70". The first cable 42 extends more proximal to the top 21 of the nestainer 20 than the second cable 42'. The first cable has a fixed end 43 that is coupled to a cable attachment 70' on a second side support 25 of the nestainer and extends across the loading opening 26 to the first side support 24 where it is latched to a cable attachment 70 by the latch 50. The latch end 45 of the cable 42 is coupled to the latch. The second cable 42' extends more proximal to the base 28 of the nestainer 20 than the first cable 42. The second cable has a fixed end 43' that is coupled to a cable attachment 70" on the second side support 25 of the nestainer and extends across the loading opening 26 to the first side support 24 where it is latched to a cable attachment 70" by the latch 50'. The latch end 45' of the cable 42' is coupled to the latch 50'.

As shown in FIG. 3, the exemplary nestainer shown in FIG. 2 is now in an open configuration with each of the two cables 42, 42' now extending along the second side support 25 with the respective latches 50, 50' coupled with a magnetic latch retainer 80, 80'.

As shown in FIG. 3, the nestainer has a loading opening width 27 across the loading opening 26 and a height 22 from the base 28 to the top 21. The nestainer has an interior and floor 23 for receiving items therein for transport.

Figure 4:
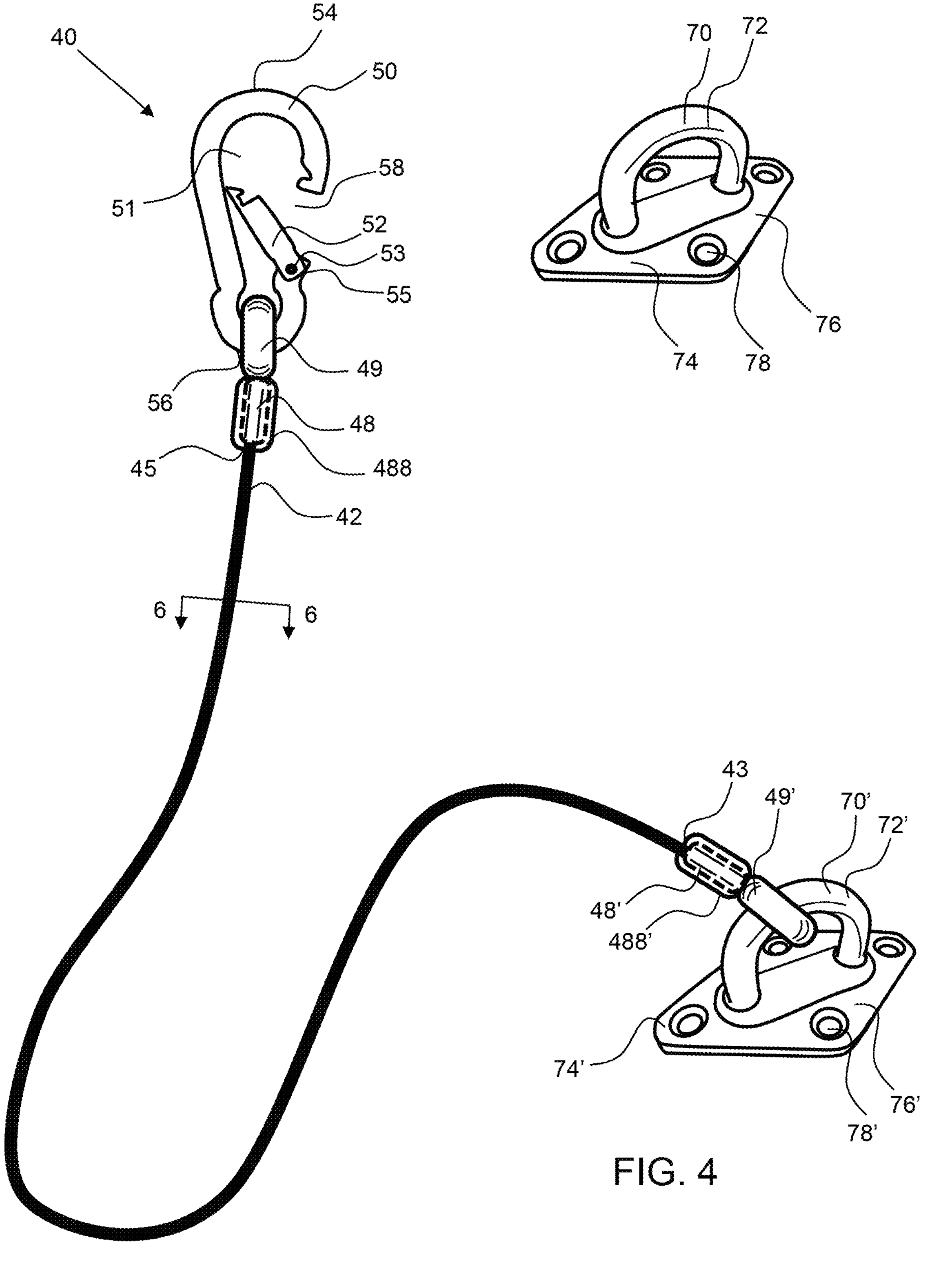
FIG. 4 shows an exemplary cable closure assembly including a cable extending from a fixed end to a latch end with the fixed end attached to a cable attachment and a latch coupled to the latch end.
Figure 5:
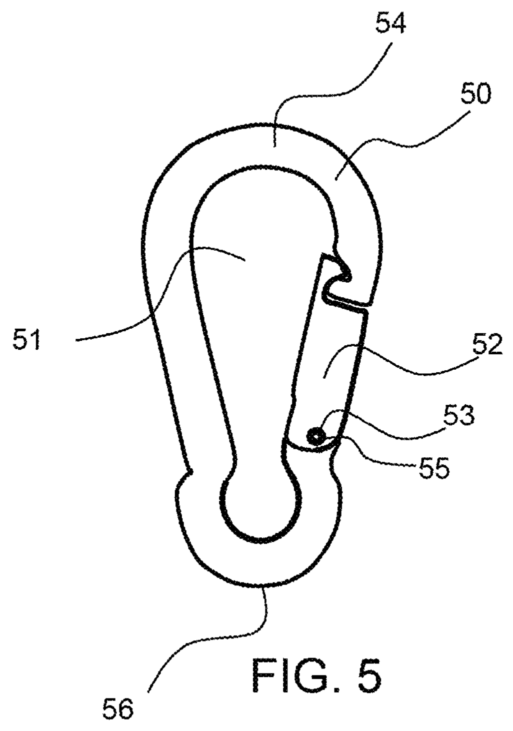
FIG. 5 shows an exemplary latch having a latch aperture that is accessible by pivoting the latch arm about the latch pivot.

Referring now to FIGS. 4 to 7, an exemplary cable closure assembly 40 includes a cable 42 extending from a fixed end 43 to a latch end 45 with the fixed end attached to a cable attachment 70' and a latch 50 coupled to the latch end configured to detachably attach to a cable attachment 70. The cable is supple and can flex or be wound in a circle without damage to the cable. The cable may have a length that is about or slightly longer than the width of the loading openings as described herein to enable the cable to extend across the loading opening. The latch 50 has a latch arm 52 configured to pivot about the latch pivot 53 to open the latch to produce a latch opening 58 or provide access to the latch aperture 51 to extend the latch around a cable attachment loop 72'. The latch may include a latch spring 55 that forces the latch arm 52 to a closed position. The latch 50 extends from a cable end 56 to an extended end 54. As shown in FIG. 5, the latch 50 is in a closed configuration with the latch arm pivoted to close the latch opening.

As shown in FIG. 4, the cable closure assembly 40 may include two cable attachments 70, 70', each having a cable attachment loop 72, 72', a mounting plate 76, 76' with fastener apertures 78, 78', respectively. The cable attachments 70, 70' may be pad eyes 74, 74', respectively. The cable attachment loop 72 forms a cable attachment loop aperture 73 with the mounting plate 76.

Figure 6:
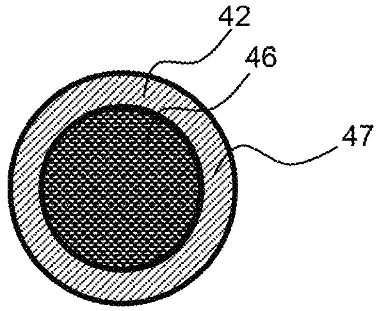
FIG. 6 shows a cross sectional view of an exemplary cable along line 6-6 in FIG. 4, that includes a cable member, such as a braided wire, with a cable cover extending thereover.

As shown in FIG. 6, an exemplary cable 42 includes a cable strength member 46, such as a braided wire, with a cable cover 47 extending thereover. A compression sleeve 48 may extend around the cable 42 or the cable member of the cable to secure the cable to the latch 50 and to the cable attachment 70. As shown in FIG. 4, the compression sleeves 48, 48' may have a sleeve cover 488, 488' respectively, such as a plastic material or elastomeric material that covers and protruding wire from the compression sleeve and will also over sharp edges of the compression sleeve for safety. The cable strength member 46 may extend from the cable cover to form a cable connector loop 49 that extends around the latch and/or the cable attachment loop 72.

Figure 7:
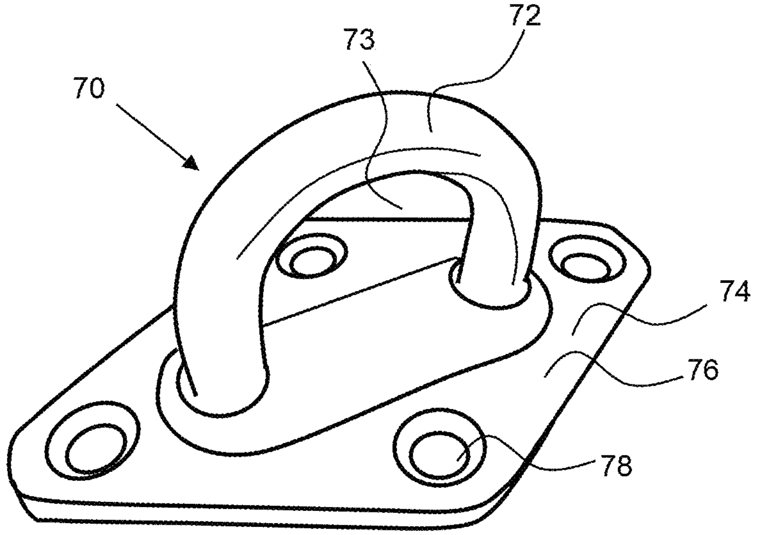
FIG. 7 shows an exemplary cable attachment configured for attachment to a nestainer and having a cable attachment loop for retaining the fixed end of the cable or detachably attaching the latch.

As shown in FIG. 7, an exemplary cable attachment 70 is configured for attachment to a nestainer and has a cable attachment loop 72 for retaining the fixed end of the cable or detachably attaching the latch. A cable attachment 70 may be a pad eye 74 having a mounting plate 76 with a plurality of fastener apertures 78, each to receive a cable attachment fastener therethrough.

Figure 8:
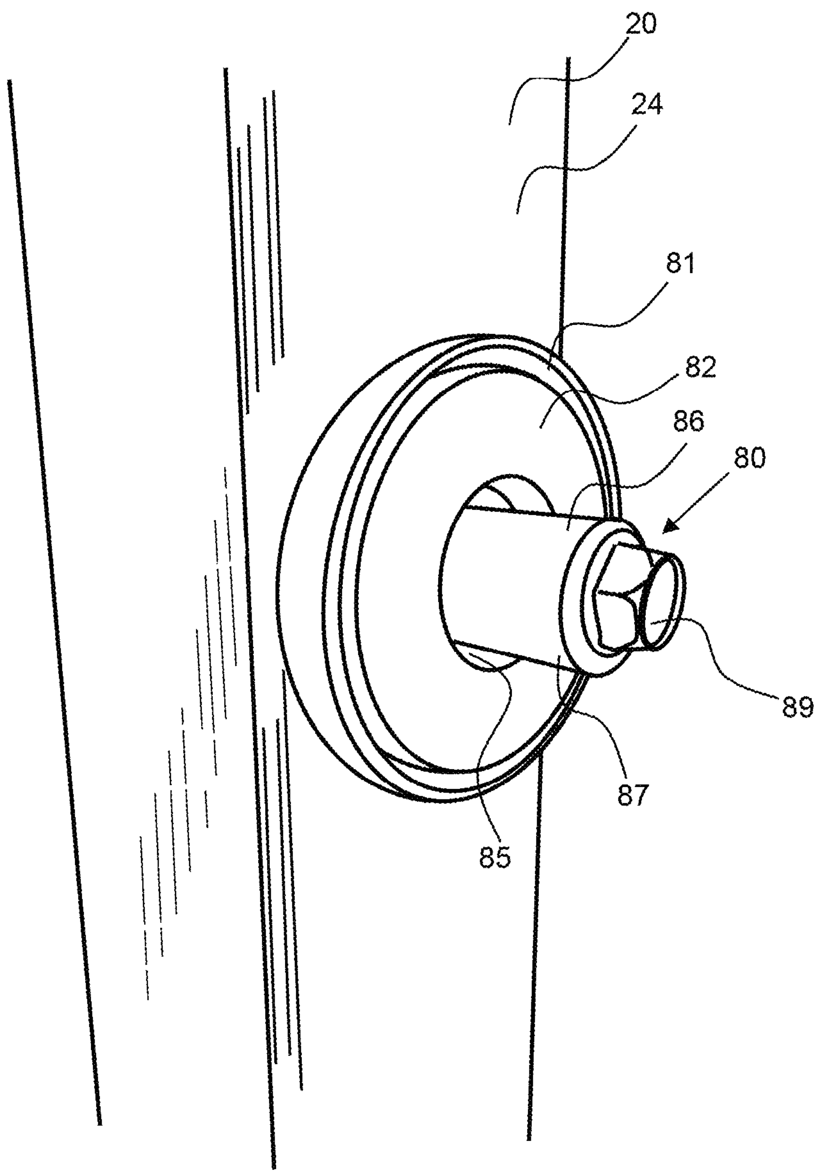
FIG. 8 shows a magnetic latch retainer coupled to a support of a nestainer with latch retainer extension extending out from a magnet.
Figure 9:
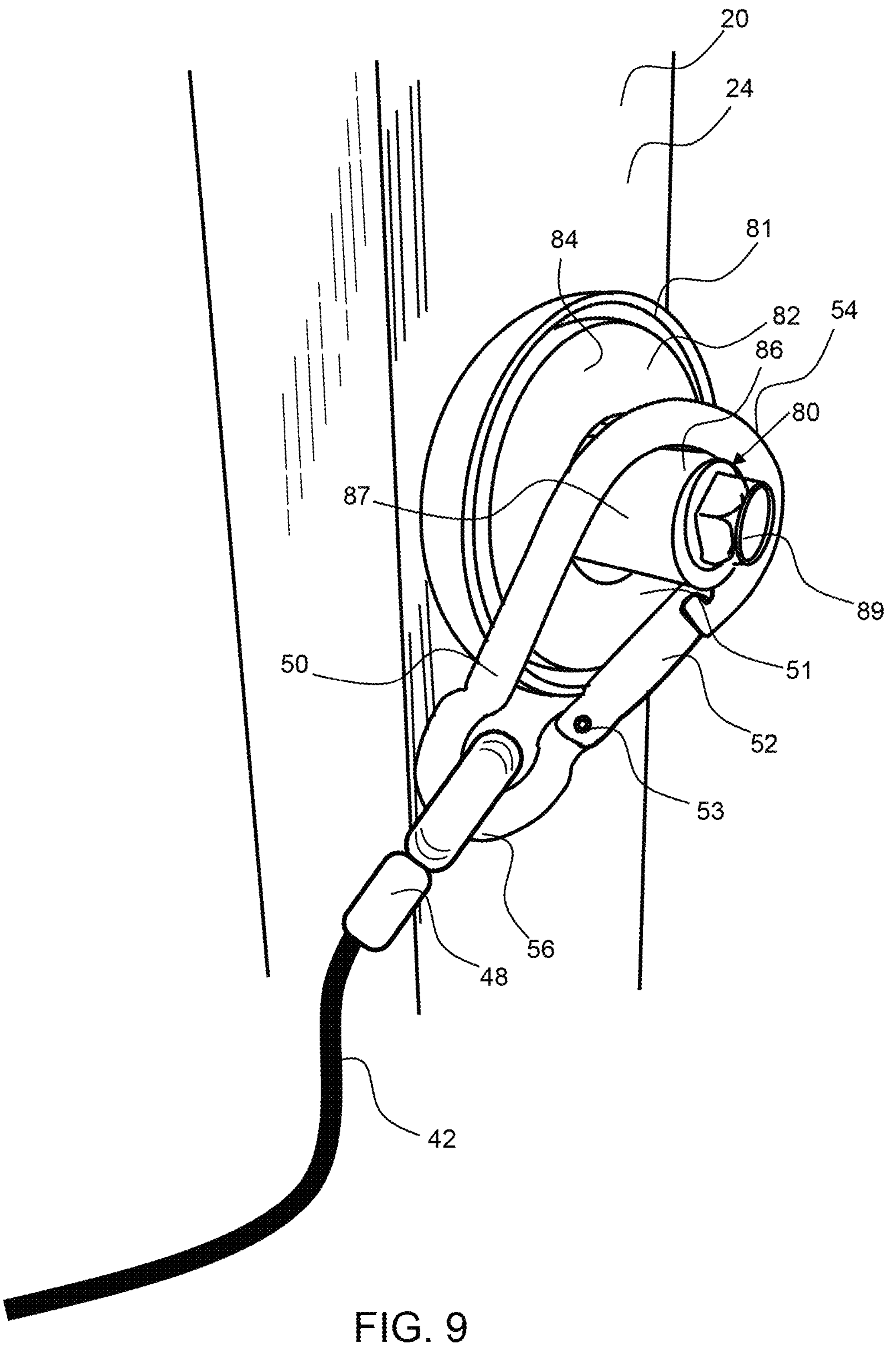
FIG. 9 shows the magnetic latch retainer shown in FIG. 8 with a latch now detachable attached with the latch aperture extending around the latch retainer extension and retained by the magnetic force of the magnet.

Referring now to FIGS. 8 and 9, a magnetic latch retainer 80 is coupled to a support, such as the first side support 24, of a nestainer 20 with a latch retainer extension 86 extending out from a magnet 82, such from the center magnet aperture 85 of a ring magnet 84. The magnet 82 is configured in a magnetic latch retainer housing 81 and is a ring magnet having a magnet aperture 85. An exemplary latch retainer extension 86 includes a bushing 87, a cylindrical extension, with a magnet fastener 89 extending therethrough and through the magnet aperture 85 and into the support of the nestainer. The magnet fastener 89 may be a bolt (bolt or screw) having bolt head or magnet fastener head 90.

As shown in FIG. 9, the magnetic latch retainer 80 shown in FIG. 8 now has a latch 50 detachable attached with the latch aperture 51 extending around the latch retainer extension 86 and retained by the magnetic force of the magnet 82. The latch aperture 51 may be larger than the latch retainer extension 86 thereby enabling the latch to be simply placed over the latch retainer extension wherein the magnet will pull the latch around the latch retainer extension. The magnetic force retains the magnet and the extension ensures that the latch does not slide off. The latch requires pulling directly away from the magnet for removal.

Figure 10:
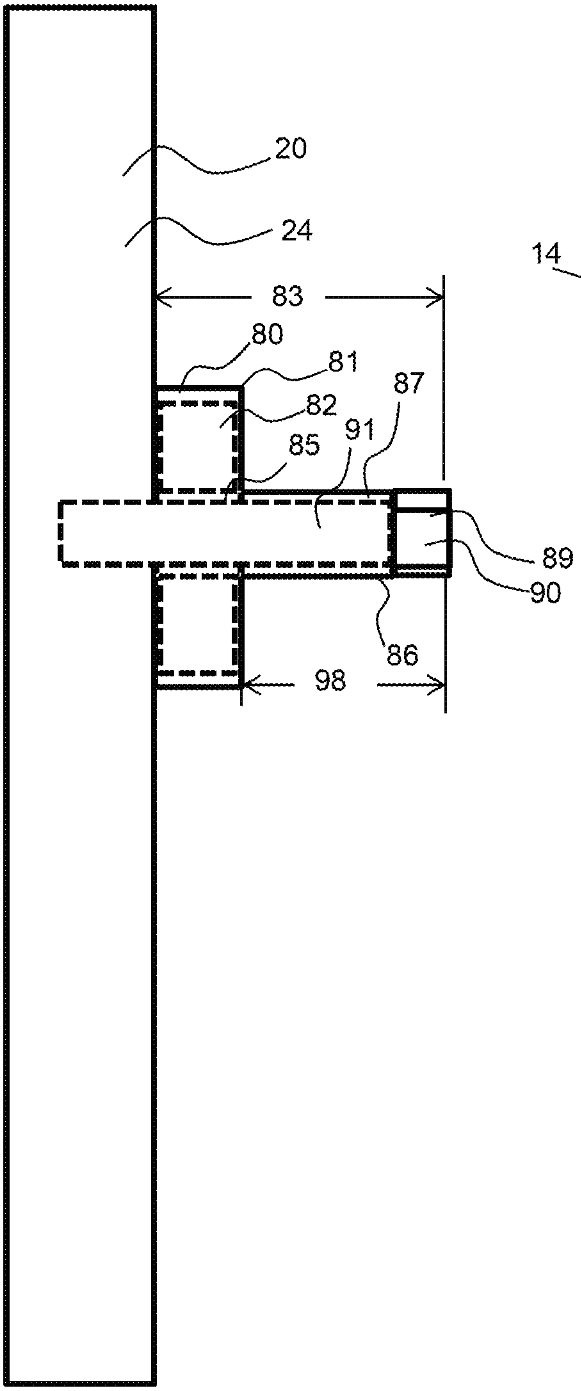
FIG. 10 shows a side view of a nestainer support with a magnetic latch retainer coupled thereto.
Figure 11:
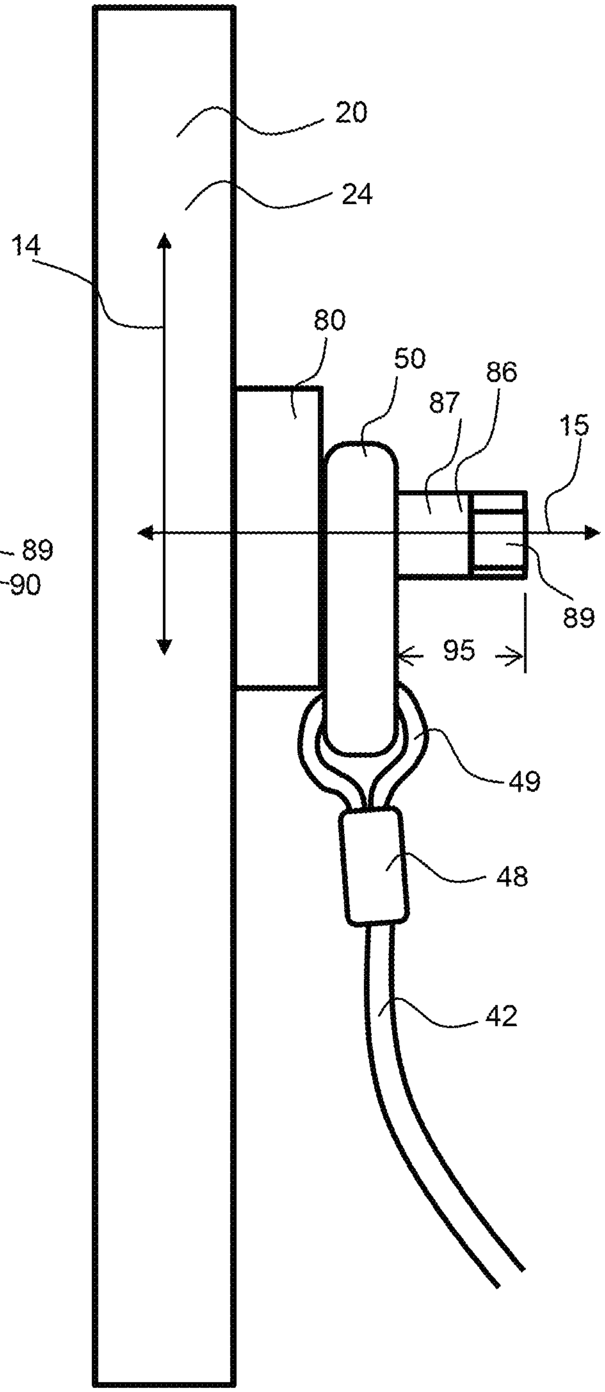
FIG. 11 shows a side view of a nestainer support with a magnetic latch retainer coupled thereto and a latch detachably attached to the magnetic latch retainer.

Referring now to FIGS. 10 and 11, a nestainer support, such as the first side support 24, is configured with a magnetic latch retainer 80 coupled thereto. The latch retainer extension 86 extends a support offset distance 83 from the support of the nestainer and a magnet offset distance 98 from the magnet 82.

As shown in FIG. 11, a latch 50 is retained around the latch retainer extension 86 by the magnet and a latch offset distance 95 extends from the latch. As described herein, the support offset distance 83 and magnet offset distance 98 may be large enough to produce a latch offset distance 95 to ensure the latch will not fall off the magnetic latch retainer. As described herein, a latch offset distance 95 should be within a range to make it easy to configure the latch thereon and remove the latch but not too short for retention purposes. The first side support 24 extends vertically or along the vertical axis and the latch retainer extension 86 extends horizontally or along the horizontal axis 15 such that the latch 50 hangs over the latch retainer extension with the latch aperture around the latch retainer extension. The latch 50 is retained vertically in position by the latch retainer extension and proximal to the magnet on the latch retainer extension by the magnet. A latch comprises a magnetic material, such as metal that is magnetically attracted to the magnet. Securing the latch with two mechanisms, vertical support and a magnetic force, makes it quick and easy to position the latch on the magnetic latch retainer.

As shown in FIG. 10, the magnet fastener shank 91 extends from the magnet fastener head 90 through the bushing 87, through the magnetic latch retainer housing 81 and into the support of the nestainer 20.

Figure 12:
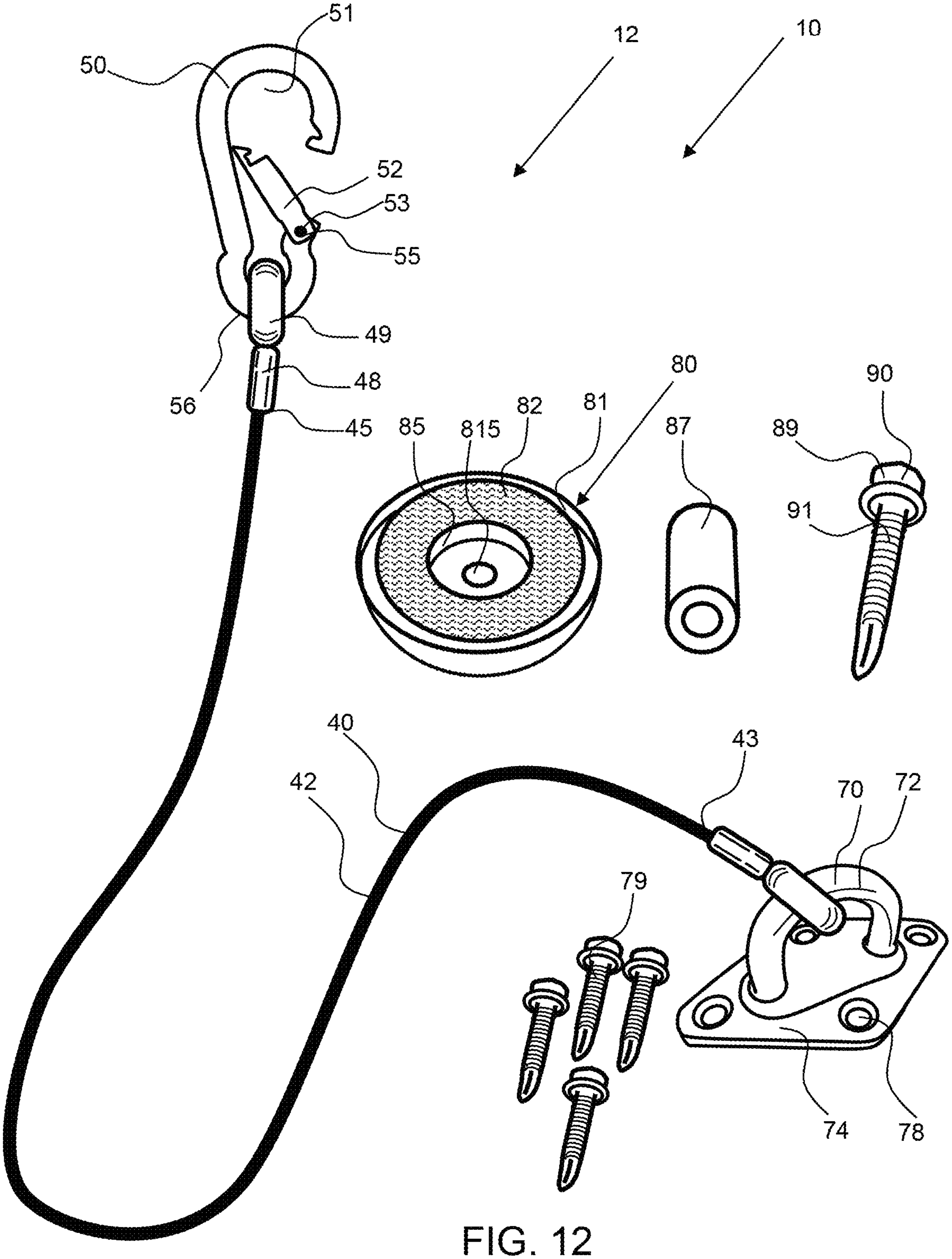
FIG. 12 shows an exemplary nestainer closure assembly.

As shown in FIG. 12, an exemplary nestainer closure assembly 12 or nestainer closure system 10 includes a cable 42 that extends from a fixed end 43, coupled with a cable attachment 70, to a latch end 45, coupled with a latch 50. A magnetic latch retainer 80 includes a magnet 82, a ring magnet having a magnet aperture 85 configured in a magnetic latch retainer housing 81 also having a housing aperture 815 for receiving the magnet fastener 89 therethrough. The magnet fastener 89 has a magnet fastener head 90 that is larger than the aperture through the bushing 87 and a magnet fastener shank 91. The cable attachment 70 may be a pad eye 74 having a mounting plate 76 with a plurality of fattener apertures 78, each of receiving a cable attachment fastener 79.

It will be apparent to those skilled in the art that various modifications, combinations, and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of closing a nestainer loading opening:

a) providing a nestainer closure system comprising:

i) a nestainer having said nestainer loading opening extending from a first side support to a second side support;

ii) a cable having a fixed end, fixed to said second side support, and a latch end;

iii) a latch coupled to the latch end of the cable and comprising;

a latch aperture;

a latch arm configured to pivot about a pivot to produce an opening into said latch aperture;

iv) a cable attachment on said first side support and comprising a cable attachment loop configured to receive said latch with the cable attachment loop extending through the latch aperture;

v) a magnetic latch retainer on said second side support of the nestainer and comprising:

a magnet; and a latch retainer extension;

wherein the latch is detachably attachable to said magnetic latch retainer with the latch retainer extension extending through the latch aperture and the latch magnetically attached to the magnet;

wherein the nestainer loading opening is in an open configuration with the latch coupled to the magnetic latch retainer, with the latch aperture configured around the latch retainer extension and with the latch magnetically attached to said magnet;

b) detaching the latch from the magnetic latch retainer on the second side support of the nestainer, by pulling the latch off from the latch retainer extension;

c) extending the cable across the nestainer loading opening to the first side support of the nestainer;

d) latching the latch to the cable attachment on the first side support of the nestainer;

wherein the nestainer loading opening is in a closed configuration with the cable extending across the nestainer loading opening with the latch latched around the cable attachment loop of the cable attachment.

2. The method of claim 1, wherein the nestainer has a base with a fork-truck opening for receiving forks of a fork truck therein to transport the nestainer.

3. The method of claim 1, wherein the nestainer loading opening has a width of 1 m or more and wherein the nestainer has a height of 2 m or more.

4. The method of claim 1, wherein the nestainer has no wheels on the base.

5. The method of claim 1, wherein the cable has a cable strength member and a cable cover extending over the cable member.

6. The method of claim 1, wherein the cable strength member includes a metal wire.

7. The method of claim 1, wherein the latch comprises a latch spring that automatically closes the latch arm about said pivot.

8. The method of claim 1, wherein the cable is a pad eye.

9. The method of claim 8, wherein the pad eye comprises a mounting plate with a fastener aperture.

10. The method of claim 1, wherein the magnet has magnetic strength of 100 gauss or more.

11. The method of claim 10, wherein the magnet is a ring magnet having a magnet aperture.

12. The method of claim 11, wherein the magnet has a diameter of 25 mm or more.

13. The method of claim 12, wherein the ring magnet is planar having a circular outer perimeter and said magnet aperture centrally configured through the ring magnet.

14. The method of claim 13, wherein the magnet aperture is a circular shape.

15. The method of claim 14, wherein the magnet has a diameter of 35 mm or more.

16. The method of claim 14, wherein the magnet is configured in a magnetic latch retainer housing.

17. The method of claim 14, wherein the latch retainer extension extends through the magnet aperture.

18. The method of claim 14, wherein the latch retainer extension extends a magnet offset distance of at least 25 mm from said magnet.

19. The method of claim 18, wherein the latch retainer extension comprises a bushing and a magnet fastener and wherein the magnet fastener extends through the bushing and the magnet aperture to secure the magnetic latch retainer to the nestainer.

20. The method of claim 18, wherein the nestainer has a base with a fork-truck opening for receiving forks of a fork truck therein to transport the nestainer;

wherein the nestainer loading opening has a width of 1 m or more and wherein the nestainer has a height of 2 m or more;

wherein the nestainer has no wheels on the base;

wherein the cable has a cable strength member and a cable cover extending over the cable member that includes a metal wire; and wherein the latch comprises a latch spring that automatically closes the latch arm about said pivot.

* * * * *